(12) United States Patent
Rosenquist et al.

(10) Patent No.: US 7,974,617 B2
(45) Date of Patent: Jul. 5, 2011

(54) METHOD AND APPARATUS OF PERFORMING FREQUENCY TRANSITIONS IN USER EQUIPMENT

(75) Inventors: Johan Rosenquist, Hoor (SE); Håkan Henningsson, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 901 days.

(21) Appl. No.: 11/934,475

(22) Filed: Nov. 2, 2007

(65) Prior Publication Data

US 2008/0176556 A1 Jul. 24, 2008

Related U.S. Application Data

(60) Provisional application No. 60/886,174, filed on Jan. 23, 2007, provisional application No. 60/886,033, filed on Jan. 22, 2007.

(51) Int. Cl.
*H04W 24/00* (2009.01)

(52) U.S. Cl. .................... 455/425; 455/423; 455/67.11; 455/67.14

(58) Field of Classification Search ............... 455/425, 455/423, 67.11, 67.14
See application file for complete search history.

(56) References Cited

U.S. PATENT DOCUMENTS

| 7,561,878 | B2 * | 7/2009 | Tam et al. | 455/425 |
| 2005/0232141 | A1 * | 10/2005 | Meier et al. | 370/209 |
| 2006/0056342 | A1 * | 3/2006 | Lee | 370/328 |

FOREIGN PATENT DOCUMENTS

GB 2352586 A 1/2001

* cited by examiner

*Primary Examiner* — Barry W Taylor

(57) ABSTRACT

A method and apparatus adapted to permit an internal handover from 1900 MHz to 900 MHz under controlled circumstances. Using the method of the present invention, the amount of time needed to disconnect a call of a user equipment (UE) under test, remove the 1800 MHz cell and setup a GSM 1900 MHz cell, allow the UE to perform a search for the 1900 MHz cell, register and establish a new call and then perform tests on GSM 1900 MHz is reduced by several seconds. On a production line in which millions of UEs are manufactured, the time saved by the present invention allows for significant savings in production costs.

6 Claims, 3 Drawing Sheets

200

Alternative solution to improve performance by allowing a non standard HO

Alternative solution to improve performance by
allowing a non standard HO

METHOD AND APPARATUS OF PERFORMING FREQUENCY TRANSITIONS IN USER EQUIPMENT

CROSS-REFERENCE TO RELATED APPLICATIONS

This application which claims the benefit of U.S. Provisional Application No. 60/886,033, filed Jan. 22, 2007, and U.S. Provisional Application No. 60/886,174, filed Jan. 23, 2007, the disclosures of which are incorporated herein by reference.

BACKGROUND

The following abbreviations used herein shall have the following meanings:
CDMA Code Division Multiple Access.
DCS Digital Communications System.
GSM Global System for Mobile Communications.
PCS Personal Communications System.
UE User equipment, including mobile terminals, cellular telephones, smart phones and/or personal digital assistants (PDAs).
WCDMA Wideband CDMA.
WLAN Wide Area Local Access Network.

When UE is tested to be either validated, or calibrated and then validated, in a production line or elsewhere, several frequency bands and/or access technologies must be tested. FIG. 1 is a message flow 100 illustrating a conventional testing of a quad band UE, when performing production testing of a UE. The steps as seen therein are as follows:

1. Start in WCDMA 2100 and perform tests on 2100 MHz;
2. Perform a handover to GSM 900 and perform tests on 900 MHz;
3. Perform an internal GSM handover from 900 MHz to 1800 MHz and perform tests on 1800 MHz;
4. Disconnect call, remove 1800 MHz cell and setup the GSM 1900 cell; and
5. Allow the UE perform a search for the 1900 MHz cell, register and establish a new call and then perform tests on GSM 1900.

Note that when certain specific frequencies are used herein, e.g. 1900 MHz, it is to be understood that reference is to the general frequency band around and possibly including said specific frequency as used in cellular telecommunication systems. The time to perform a handover is less then 100 milliseconds (ms) for a GSM handover, however the time when moving from step 4 to step 5 above can be as long as 10 seconds or more. While a UE can handle different access technologies such as WCDMA, GSM, WLAN, and/or different frequency bands, such as GSM, DCS, PCS and/or WCDMA 1900 MHz/2100 MHz, the standards setting forth the specifications for the different technologies require the UE to transition between technologies and/or frequencies in defined ways. The transition can be performed in one of two methods. The first method is in a non-dedicated mode wherein the UE does not have a dedicated connection established. To change access technology or frequency in a non-dedicated mode, the UE must perform a search for the target technology/frequency, which is time consuming. The second method is in a dedicated/connected mode. The change of access technology or frequency in a dedicated mode is performed very quickly.

In the disclosure of Leung, two special commands are required to perform tests:
Command_1: A handover command with a channel number in a certain range orders the UE to operate in the PCS band.
Command_2: A handover command with a channel number in a certain range orders the UE to operate in the DCS band.

In Leung, commands are sent from a personal computer via a serial port to the UE. The personal computer is also connected via a general purpose instruction bus to a GSM tester, which emulates a network. Because of the time necessary to perform tests on the available technologies and frequencies of a UE, production times are adversely affected.

What is desired is a method and apparatus that allows non-standardized transitions between different access technologies and frequencies so that the need for non-dedicated mode transitions can be eliminated.

SUMMARY

When a UE is tested in a production line or elsewhere, several access technologies and/or frequency bands must be tested so as to either be validated or calibrated then validated. The present invention is a method and apparatus adapted to significantly reduce the time necessary to perform testing. Although an embodiment of the present invention is disclosed which is operable with a UE that is transitioning between two incompatible GSM frequencies, the present invention is not limited to such embodiment.

The present invention is adapted to permit an internal handover from 1900 MHz to 900 MHz under controlled circumstances, which is not currently possible. Using the present invention, the amount of time needed to disconnect a call of a UE under test, remove the 1800 MHz cell and setup a GSM 1900 MHz cell, allow the UE to perform a search for the 1900 MHz cell, register and establish a new call and then perform tests on GSM 1900 MHz can be reduced by several seconds. On a production line in which millions of UEs are manufactured, the time saved by the present invention allows for significant savings in production costs.

DETAILED DESCRIPTION

A number of conventional UEs operating on a mobile platform of the Applicant, are able to operate in dual band modes: GSM900/1800 or GSM850/1900. For several reasons, as required by the technical standards applicable thereto, these conventional UEs are unable to move between frequencies in the different modes when they have a dedicated connection to the mobile network. One reason is that the Absolute Radio Frequency Channel Numbers ("ARFCNs") overlap in the 1800 MHz and 1900 MHz bands. ARFCN is a channel numbering scheme used to identify specific RF channels in a GSM radio system. Therefore, because the UE is unable to tell if an assigned frequency belongs to the 1800 MHz or 1900 MHz band, it is assumed that the assigned ARFCN belongs to the mode in which it is then currently operating. For example, assume a UE under test is in mode GSM900/1800 and receives a traffic channel ("TCH") ARFCN with an identification (id)=700. In the 1800 MHz frequency mode this id maps to a specific frequency and the UE will move to the TCH on this frequency. However if the UE were in mode GSM850/1900 and received an assignment to ARFCN with id=700, it would move to another frequency even if the message content is the same.

Similarly, if a UE under test is operable in a quad band mode, WCDMA 2100, GSM 900/1800/1900, in the absence of the present invention, there is no method or apparatus adapted to test all three GSM bands while keeping the UE connected to the test instrument. While it is possible to keep the call active while moving between GSM 900 and 1800, there is no process for transferring the call to the 1900 band while the connected to the emulated network.

Figure 1:
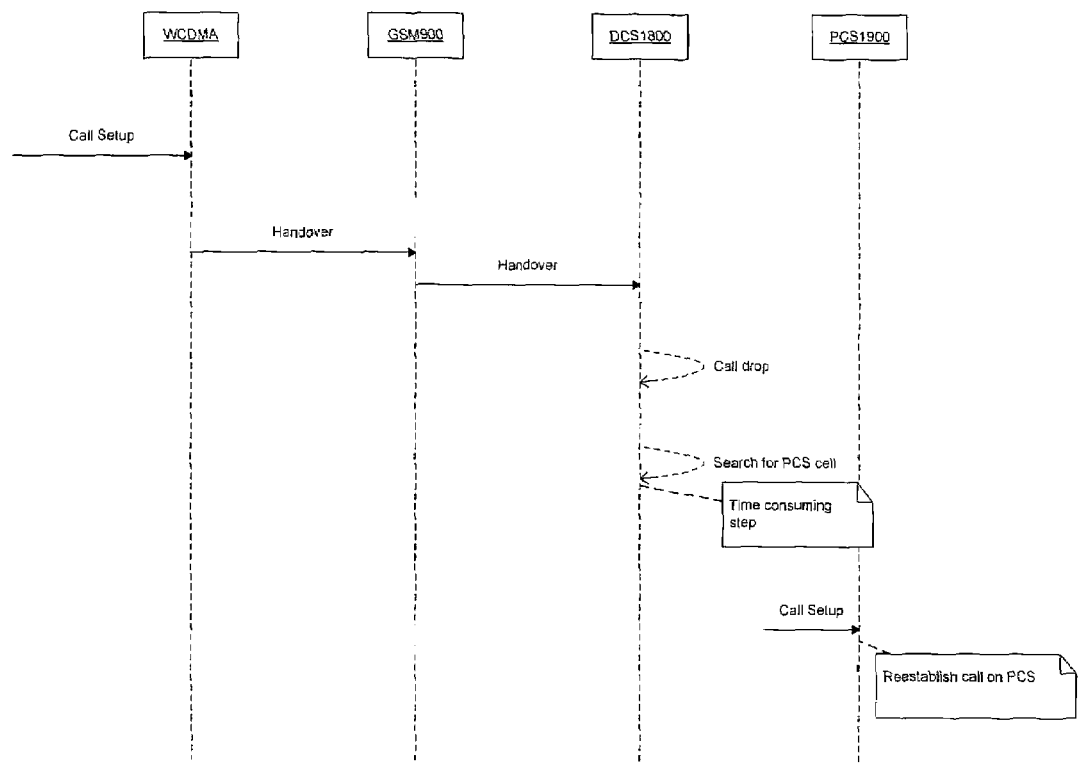
FIG. 1 is a message flow for the conventional testing of a quad band UE.
Figure 2:
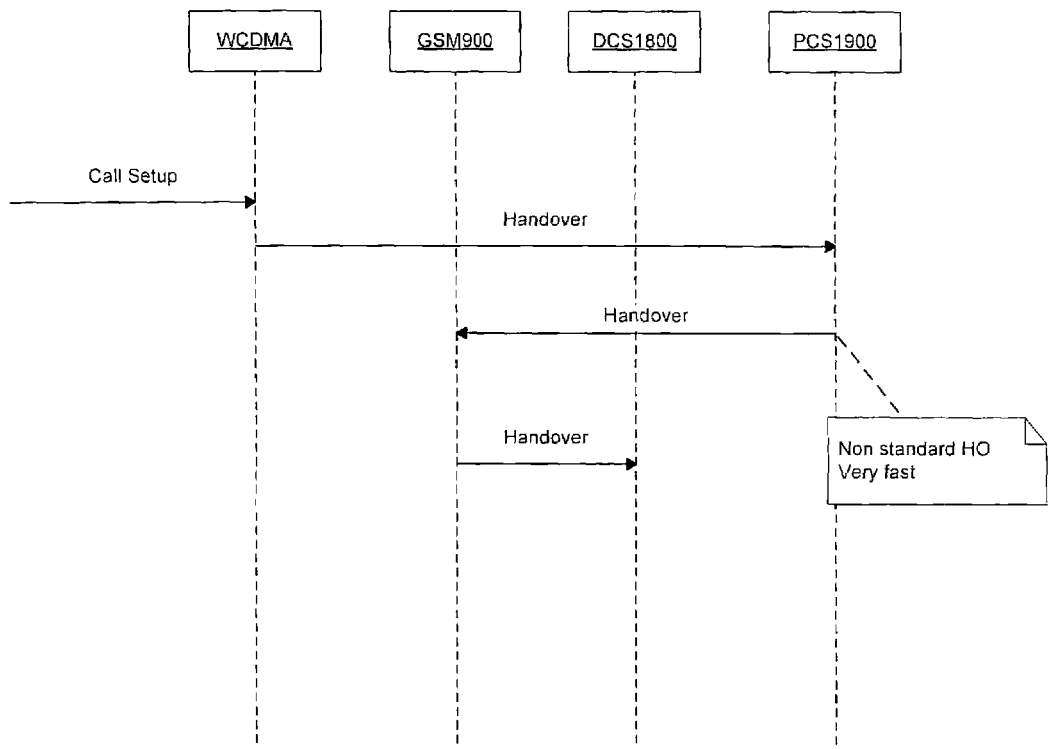
FIG. 2 is a message flow for the testing of a quad band UE using the method of the present invention.

The present invention allows a UE with an active call on the 1900 MHz band to move to the 900 MHz band if certain protection conditions are met, so that the UE can keep the call active through the full sequence. FIG. 2 is a message flow 200 for the testing of a quad band UE using the method of the present invention. The steps of the present invention as seen therein are as follows:

1. Activate call in WCDMA 2100 and perform tests in 2100 MHz band;
2. Handover the call to GSM 1900 and perform tests in 1900 MHz band;
3. Allow the non-standard GSM handover from 1900 MHz band to 900 MHz band and perform tests in 900 MHz band; and
4. Perform an internal GSM handover from 900 MHz band to 1800 MHz band and perform tests in 1800 MHz band.

In the foregoing sequence, the call is not disconnected and the time consuming step of disconnecting between the 1900 MHz band and the other GSM bands is omitted. Advantageously, the present invention significantly reduces the time to test all GSM bands of a UE.

In the present invention, the order of testing the bands is different that of the conventional method. For example, pseudo code implemented in the UE for transitioning from the 1900 MHz band to the 900 MHz band is as follows:

if (the UE is currently registered in a controlled environment. Possibly identified by a specific PLMN)
{if (The UE is currently on a PCS ARFCN and the target ARFCN is on the 900 band)
{Due to the special conditions, allow the transition even though it is not formally supported.}}

Psuedo code for a less secure alternate implementation of the present invention is as follows:
if(currentARFCN=defined1900ARFCN AND targetARFCN=defined900ARFCN
{Due to the special conditions, allow the transition even though it is not formally supported.}

Figure 3:
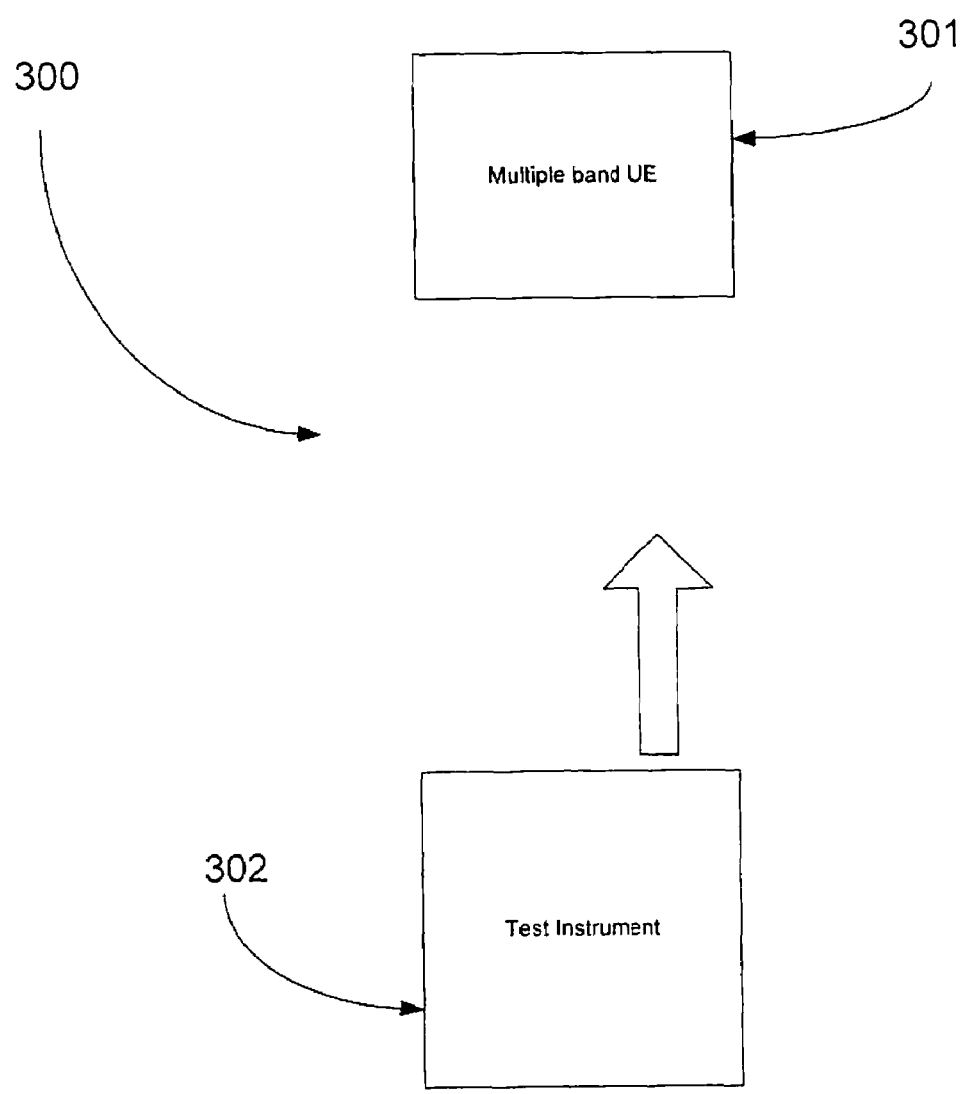
FIG. 3 is a block diagram of a quad band UE adapted to use the method of the present invention

FIG. 3 is a block diagram 300 of a quad band UE 301 adapted to use the foregoing method of the present invention. As seen therein, the quad band UE 301 is coupled to a test instrument 302. The UE 301 and test instrument 302 are preferably coupled over an RF cable and no other connection is needed. Handover commands for the different frequencies are sent to the UE 301 from the test instrument 302.

The foregoing examples are not exhaustive as the actual transitions between technologies would be part of a more detailed testing protocol. As noted above, the non-standardized transition from PCS 1900 to GSM 900 is only allowed when special conditions are fulfilled. These conditions are evaluated by the UE. The conditions are: PLMN 00000 or PLMN 00101, target frequency in GSM band and source frequency in PCS band. These conditions can never occur in a actual network, but these conditions can set in a controlled test environment. The present invention does not require any special equipment such as a PC, nor is the test equipment required to send any special commands to the UE under test. Advantageously, the present invention permits the testing process or intelligence to reside in the UE, hence no outside test equipment or software is required, saving on costs and set-up time. The method of the present invention is implemented in a UE, including in hardware or as computer code as part of a mobile platform executable by a processor of the UE.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of testing a quad band user equipment (UE), comprising the steps of:
    activating a call on the UE in WCDMA 2100 and performing validation tests in the 2100 MHz band;
    performing a handover of the call to GSM 1900 and performing validation tests in the 1900 MHz band;
    performing a non-standard GSM handover from 1900 MHz band to the 900 MHz band and performing validation tests in 900 MHz band, wherein due to special conditions the non-standard GSM handover is allowed even though the non-standard GSM handover is not formally supported; and
    performing an internal GSM handover from the 900MHz band to the 1800 MHz band and perform validation tests in the 1800 MHz band.

2. The method of claim 1, wherein the UE is selected from a mobile terminal, cellular telephone, smart phone and personal digital assistant (PDA).

3. A quad band user equipment (UE), having a mobile platform, comprising:
    means for activating a call on the UE in WCDMA 2100 so that validation tests can be performed on the UE in the 2100 MHz band;
    means for performing a handover of the call to GSM 1900 so that validation tests can be performed in the 1900 MHz band;
    means for performing a non-standard GSM handover from 1900 MHz band to the 900 MHz band such that validation tests can be performed in 900 MHz band, wherein due to special conditions the non-standard GSM handover is allowed even though the non-standard GSM handover is not formally supported; and
    means for performing an internal GSM handover from the 900 MHz band to the 1800 MHz band such that validation tests can be performed in the 1800 MHz band.

4. The UE of claim 3, wherein the UE is selected from a mobile terminal, cellular telephone, smart phone and personal digital assistant (PDA).

5. A mobile platform adapted to be installed and executed by a user equipment, (UE) comprising computer code adapted to:
    activate a call on the UE in WCDMA 2100 so that validation tests can be performed on the UE in the 2100 MHz band;
    perform a handover of the call to GSM 1900 so that validation tests can be performed in the 1900 MHz band;

perform a non-standard GSM handover from 1900 MHz band to the 900 MHz band such that validation tests can be performed in 900 MHz band; and
perform an internal GSM handover from the 900MHz band to the 1800 MHz band such that validation tests can be performed in the 1800 MHz band.

6. The mobile platform of claim 5, adapted to be run on a UE selected from a mobile terminal, cellular telephone, smart phone and personal digital assistant (PDA).

* * * * *

UNITED STATES PATENT AND TRADEMARK OFFICE
CERTIFICATE OF CORRECTION

PATENT NO.         : 7,974,617 B2
APPLICATION NO.    : 11/934475
DATED              : July 5, 2011
INVENTOR(S)        : Rosenquist et al.

It is certified that error appears in the above-identified patent and that said Letters Patent is hereby corrected as shown below:

In Column 1, Line 49, delete "then" and insert -- than --, therefor.

In Column 2, Line 51, delete "invention" and insert -- invention. --, therefor.

Signed and Sealed this
Eighth Day of November, 2011

David J. Kappos
*Director of the United States Patent and Trademark Office*